P. A. BOECK.
FILTERING APPARATUS FOR LABORATORY USE.
APPLICATION FILED JULY 15, 1912.
1,081,574.
Patented Dec. 16, 1913.
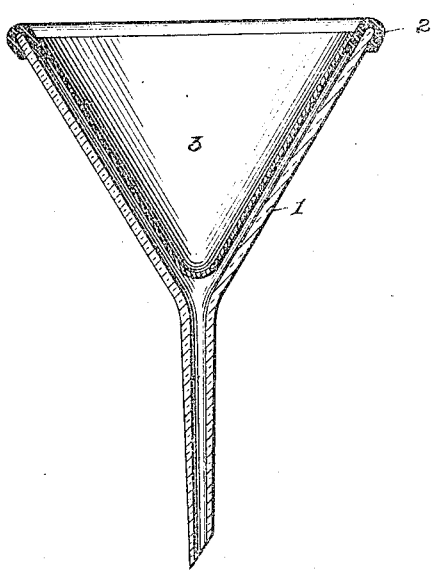

UNITED STATES PATENT OFFICE.

PERCY A. BOECK, OF WORCESTER, MASSACHUSETTS, ASSIGNOR TO NORTON COMPANY, OF WORCESTER, MASSACHUSETTS, A CORPORATION OF MASSACHUSETTS.

FILTERING APPARATUS FOR LABORATORY USE.

1,081,574.

Specification of Letters Patent.    Patented Dec. 16, 1913.

Application filed July 15, 1912. Serial No. 709,526.

*To all whom it may concern:*

Be it known that I, PERCY A. BOECK, a citizen of the United States, residing at Worcester, in the county of Worcester and State of Massachusetts, have invented certain new and useful Improvements in Filtering Apparatus for Laboratory Use, of which the following is a specification.

This invention relates to filtering devices for laboratory use, and particularly to filters for quantitative analytical purposes.

For a full understanding of the invention, reference is made to the accompanying drawing wherein the figure is a central vertical section illustrating the invention.

In said drawing, 1 represents a glass funnel of standard form, and 2 a ring or band, preferably of soft rubber, encircling the top of the funnel, forming a substantially tight joint therewith and with the filter-cone 3, and serving also as a support for this cone.

The cone 3 is a porous body having a rounded apex, and walls diverging at an angle of 60°. The cone preferably consists essentially of previously-molten alumina, and may be prepared in the manner described in my prior application Ser. No. 700,398, filed May 29, 1912, as follows: Calcined bauxite or other impure commercial form of alumina, or pure or purified alumina prepared by chemical methods, is fused in an electric furnace, and the product is crushed to grain and graded, in the known manner as practised for the manufacture of abrasive articles. The grains are preferably then roasted in an oxidizing atmosphere in order to eliminate traces of carbids or other reduction products, which if present in the finished article, might cause local disintegration or pitting of the body. The grain is then mixed with a small proportion, usually from five to fifteen per cent., or somewhat more, of a plastic clay, which serves as a bond, and sufficient water to produce a thin slip or body of suitable consistency to form the article. The slip is then applied usually as a comparatively thin layer to the surface of a conical mold or form, which should be highly absorptive in character. Plaster of Paris is suitable for the preparation of such molds or forms. The mold with the applied refractory coating is then dried at moderate temperatures, say about 50° C., after which the article may be separated from the mold and will be found sufficiently strong to endure firing. The molds or forms may be used an indefinite number of times. The firing is accomplished in kilns under standard conditions and at temperatures sufficiently high to fuse, vitrify or in some instances to partially vitrify the bond, as may be required by porosity or other characteristics desired in the body.

By the use of small proportions of a clay or other ceramic bond, as above described, a double result is secured: for the articles may be made highly porous, possessing a remarkably high filtering capacity per unit area; and they retain in a large measure the refractory character and chemical inertness of the alumina grain.

The degree of porosity of the articles may be varied within certain limits by varying the proportion of the clay bond, the highest porosity as well as the most refractory article being secured by using the minimum proportion of a highly plastic clay. The porosity may also be controlled within certain limits by varying the size of the grain. When alumina is used, grains between 46 and 220 mesh have been found best suited for general purposes.

Instead of previously-molten alumina, the cones may be prepared from carborundum or other highly refractory material.

The device as above described presents several important advantages for quantitative analytical work, viz.:

(1) No portion of the filter-cone projects above the top of the funnel to afford lodgment for dissolved salts. Practically the entire area of the cone is actively engaged in filtering, and the soluble salts may be readily washed from the filter by the application of wash water at proper points inside of the funnel. This obviates the necessity of glazing the upper portion of the cone, and is of vital importance for quantitative work where constancy in weight of the filtering medium is imperative.

(2) The filtering medium being in contact with only a very small area of rubber at the top of the funnel, the filtering area is materially increased.

(3) The cone may be used either with or without a filter-paper or other filtering medium, according to the nature of the material to be filtered.

(4) This type of filter is applicable for use with forms of funnel ordinarily employed for analytical work, and does not require a special type of container, as is the case with ordinary filtering crucibles.

(5) The tight joint formed at the periphery of the cone permits the use of vacuum or reduced pressure as an aid to filtration.

I claim:

1. A filtering apparatus comprising a funnel, an elastic band extending into the same, and a porous cone located within the funnel wholly below the top thereof and supported by said elastic band.

2. A filtering apparatus comprising a funnel, an elastic band covering the rim of the funnel and extending into the same, and a porous cone conforming in shape to the interior of the funnel located within the same and supported by said elastic band.

In testimony whereof I affix my signature in presence of two witnesses.

PERCY A. BOECK.

Witnesses:
W. H. McNEILLY,
ROBERT P. CAPRON.